US009161103B2

(12) United States Patent
Penning

(10) Patent No.: US 9,161,103 B2
(45) Date of Patent: Oct. 13, 2015

(54) SWITCH MODULE

(75) Inventor: Bruce R. Penning, Louisville, KY (US)

(73) Assignee: General Equipment and Manufacturing Company, Inc., Louisville, KY (US)

( * ) Notice: Subject to any disclaimer, the term of this patent is extended or adjusted under 35 U.S.C. 154(b) by 504 days.

(21) Appl. No.: 13/558,881

(22) Filed: Jul. 26, 2012

(65) Prior Publication Data

US 2013/0027831 A1    Jan. 31, 2013

Related U.S. Application Data

(60) Provisional application No. 61/512,738, filed on Jul. 28, 2011.

(51) Int. Cl.
*H01H 47/00* (2006.01)
*H04Q 9/00* (2006.01)
*F15B 15/28* (2006.01)

(52) U.S. Cl.
CPC .............. *H04Q 9/00* (2013.01); *F15B 15/2807* (2013.01); *H04Q 2209/80* (2013.01)

(58) Field of Classification Search
CPC .. F15B 15/2807; H04Q 2209/80; H04Q 9/00; H01F 7/1844; H01H 47/325; H01H 47/002; F01L 9/04; F02D 41/20
USPC .......... 361/139, 140, 141, 160, 161; 137/552, 137/554, 556, 556.3; 340/635, 644
See application file for complete search history.

(56) References Cited

U.S. PATENT DOCUMENTS

| 5,647,396 | A | 7/1997 | Stommes et al. |
| 6,135,147 | A | 10/2000 | Peters et al. |
| 6,484,974 | B1 * | 11/2002 | Franke et al. ................. 246/476 |
| 2010/0219961 | A1 | 9/2010 | Vidal et al. |

FOREIGN PATENT DOCUMENTS

WO    WO-2008072258 A2    6/2008

OTHER PUBLICATIONS

International Search Report for International Application No. PCT/US2012/047040 mailed Oct. 11, 2012.
Written Opinion for International Application No. PCT/US2012/047040 mailed Oct. 11, 2012.

* cited by examiner

*Primary Examiner* — Steven Lim
*Assistant Examiner* — Sisay Yacob
(74) *Attorney, Agent, or Firm* — Marshall, Gerstein & Borun LLP

(57) ABSTRACT

A switch module used for position sensing may be operated in a number of modes for compatibility with a number of legacy position sensing products. A dry switch circuit can be configured to provide a direct output, emulating dry reed, high-side or low-side switched configurations. Alternatively, the dry switch circuit can be connected to an input of a NAMUR circuit to provide the known current output for that standard. In another configuration the dry switch can be selectively coupled to one of two NAMUR circuits allowing the switch module to provide a low-to-high current NAMUR output or a high-to-low current NAMUR output.

17 Claims, 8 Drawing Sheets

SWITCH MODULE

BACKGROUND

In process control applications, the position of a valve is vital element of information for monitoring and decision making. There are a number of different kinds of valve position monitors available and a number of different kinds of mechanisms for reporting valve position.

SUMMARY

A switch module for valve position reporting may incorporate multiple configurations of output reporting to be backwards compatible with a number of different kinds of monitoring or reporting equipment alternatives. The switch module may use a dry contact relay or other relay to report position sensed by either a mechanical or proximity type sensor. The dry contact relay may replace previous configurations of dry contact, high-side switch or low-side switch. In an alternate configuration, the relay may also be connected to one or more NAMUR output circuits to provide a current output, known in the industry, instead of the dry contact output.

The switch module may be combined in groups to provide single-pole double-throw, double-pole single-throw, etc., switch alternatives or other switch alternatives, for example, for redundancy or alternate reporting.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

In many factory or other process control environments, several different forms of automation control and/or feedback may be used and include both current-based and voltage based signals with different levels of feedback or notification. The various combinations of inputs and outputs for control equipment can create a problem for inventory management of replacement parts stock. A switch module having configurable output formats helps address backward compatibility in various control applications.

Figure 1:
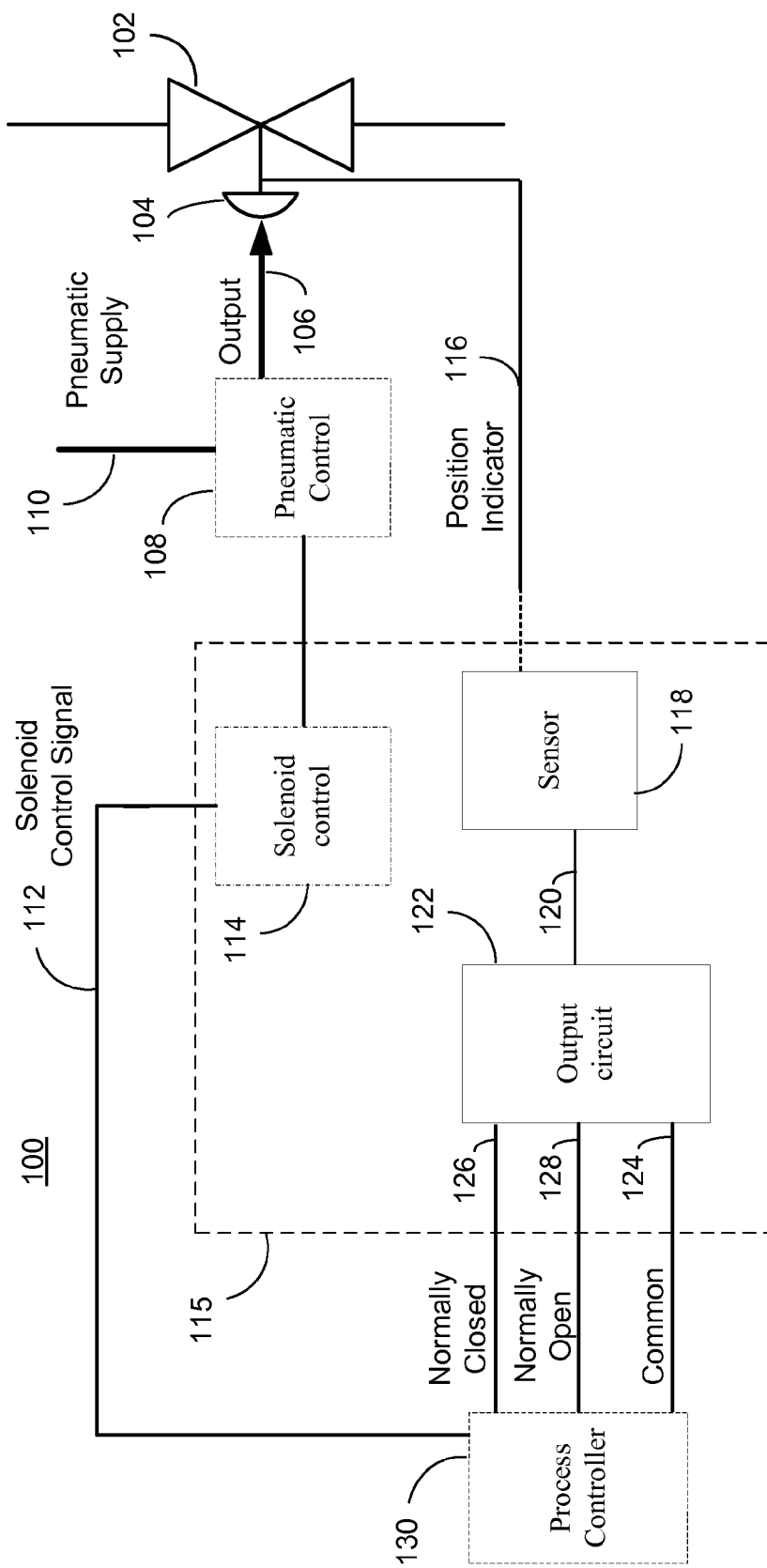
FIG. 1 is a simplified and representative block diagram of a prior art control system.

FIG. 1 is a simplified and representative block diagram of a prior art control system 100. The simplified control system 100 illustrates a valve 102, such as may be found in a manufacturing process. A valve control 104 may move to mechanically open or close the valve 102. The valve control 106 may itself be operated by an electric motor (not depicted) or a pneumatic control 108 with a pneumatic supply 110. A process controller 130 may directly or indirectly control the valve 102 via a control signal 112 for a solenoid control circuit 114. The solenoid control circuit 114 may include a power adapter (not depicted) to accept a wide range of control voltages, both AC and DC. In some embodiments the range may be from around 24 volts to around 120 volts.

A part of a control process is knowledge of the state of the valve, at its simplest, is the valve open or closed. A switch 115 may be used to send information to the process controller 130 about the state of the valve 102. The switch 115 may include the solenoid control circuit 114 discussed above, in some cases because of the proximity to the valve and the availability of wiring connections to the process controller 130.

The switch 115 may include a sensor 118 that interacts with a valve position indicator 116. Sensors and the interaction with the valve position indicator 116 are discussed in more detail below.

The switch 115 may also include an output circuit 122. One typical output circuit includes a common connection 124, a normally closed connection 126 that is connected to the common connection 124 when the position indicator 116 is in a first position, and a normally open connection that is connected to the common connection 124 when the position indicator 116 is in a second position. As is known, the specific application of these connections 124, 126 and 128 in a particular system is up to a system designer in consideration of the capabilities the specific process controller 130.

There are several types of output circuit 122. Two exemplary output circuits are discussed below with respect to FIGS. 2 and 3.

While a valve 102 is used in this example, the switch 115 may be used in virtually any environment to sense the position of a moving part, particularly those with two positions. Additional switches can be used to sense moving parts having more than two positions.

Figure 2:
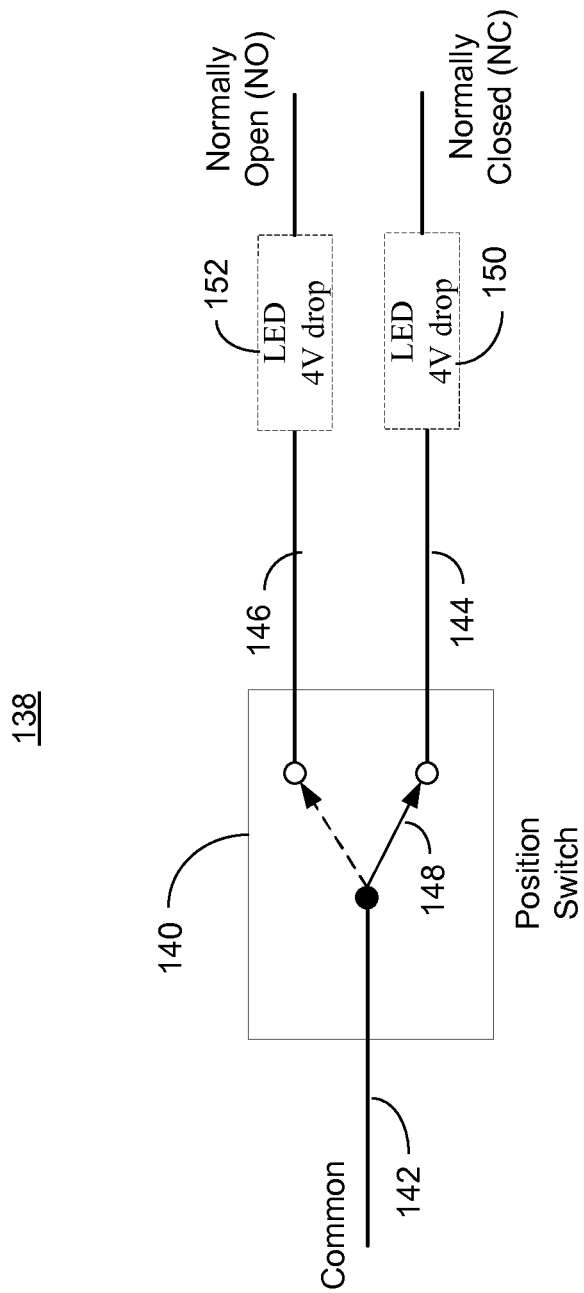
FIG. 2 is a simplified and representative prior art dry switch position sensing circuit.

FIG. 2 is a simplified and representative prior art dry switch position sensing circuit 138. The circuit 138 includes a position switch 140, a common connection 142, a normally closed (NC) connection 144, a normally open (NO) connection 146, and an actuator 148 that connects the common connection 142 to one or the other of the two output connections 144 and 146. Some installations only use one or the other of the two outputs 144, 146 while other installations may use both. Optional indicators 150 and 152 may include light emitting diodes (LED) as indicators for which output is active. In some installations a current through the circuit 138 is used both for determining a position of a valve, but also to indicate that a complete circuit is intact. In some embodiments, the indicators 150 and 152 may have a known voltage drop, in some cases, around 4 volts.

In operation, the actuator 148 responds to a change in the position of the valve or other element being sensed and moves from the normally closed position to the normally open position. Whether the normally closed position is used to signal that the valve is opened or closed is a design choice, or a function of other process control elements.

Figure 3:
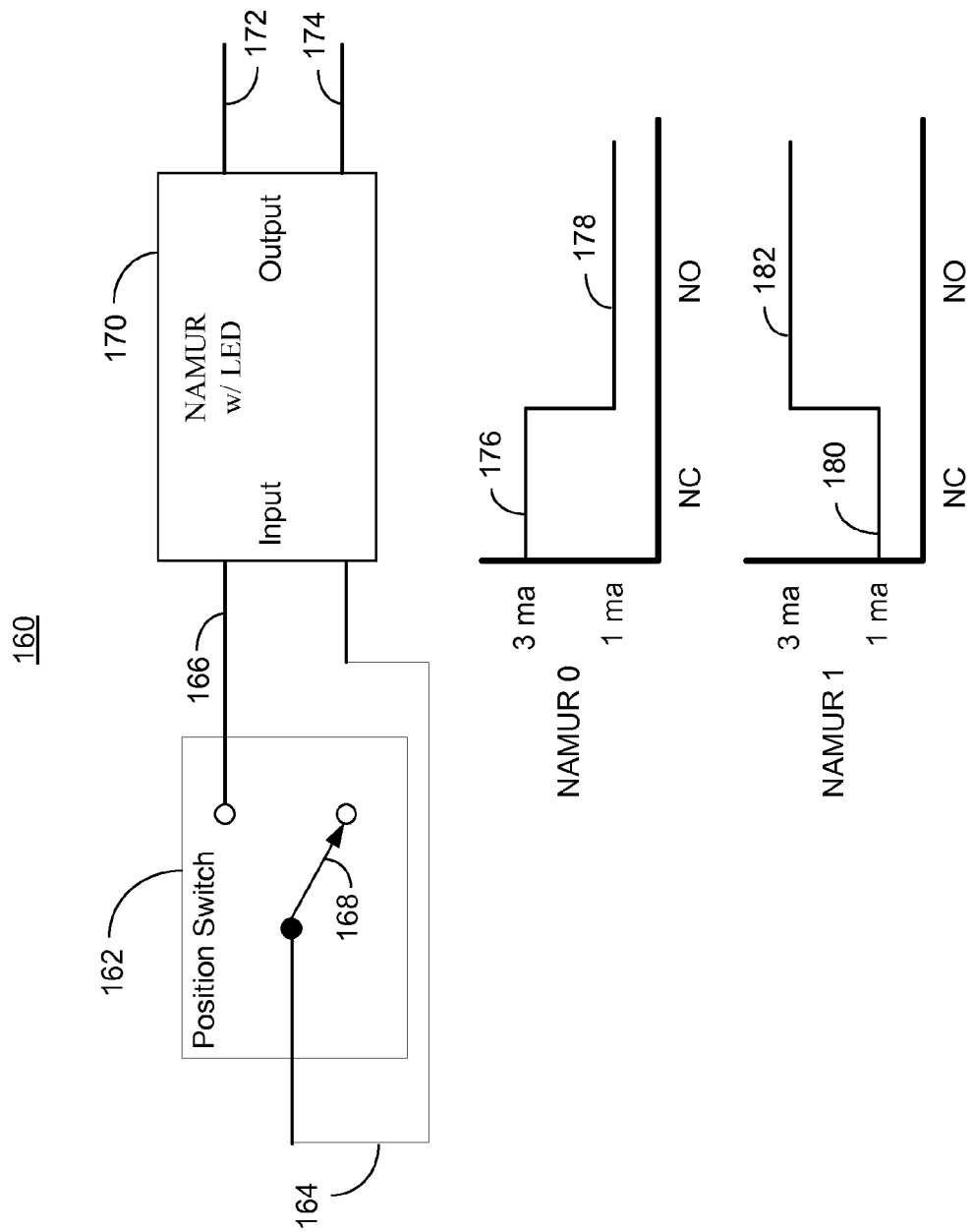
FIG. 3 is a simplified and representative prior art NAMUR position sensing circuit.

FIG. 3 is a simplified and representative prior art NAMUR position sensing circuit 160. In this configuration a position switch 162 controls a separate output circuit 170 that has its own input and output connections. When the position switch 162 is in a first position, the output has a constant current output at a first level through output connections 172 and 174. When the position switch 162 changes polarity, indicating, for example, the valve moving to an open state, the connections 164 and 166 are connected and the output circuit 170 responds by changing the current at the output connections 172 and 174 to a second constant current.

As illustrated in FIG. 3, two common current levels are supported in a so called, "NAMUR" configuration. When the position switch is normally closed, the output current 176 may be at or above 3 ma. When the switch changes to the normally open position, the NAMUR output current may change to be at or below 1 ma 178. Alternatively, another type of NAMUR circuit may source at or below 1 ma 180 when in the normally closed position and may source greater than or equal to 3 ma 182 when normally open. In other embodiments, a NAMUR circuit may simply provide a variable resistance and the current values are set by an external source. NAMUR is an acronym for a German standards setting body, the Normenarbeitsgemeinschaft für Mess- and Regeltechnik in der Chemischen Industrie.

A person familiar with the industry will know that the position switch configurations illustrated in FIGS. 2 and 3 are not exhaustive, for numerous other switch and output configurations are common, including active high-side drive and active low-side drive circuits.

Further, a number of position sensing switch types and associated position sensing techniques are found in the industry. These range from simple mechanical levers connected to the valve and operating a switch to electric field inductive switches, magnetic reed switches, and magnetic field snap switches. Therefore, there is a great variety of position switches and position sensing alternatives on the market, and more particularly, installed in field. The need to maintain and stock replacement parts for each of these alternatives may quickly become a logistical problem.

Figure 4:
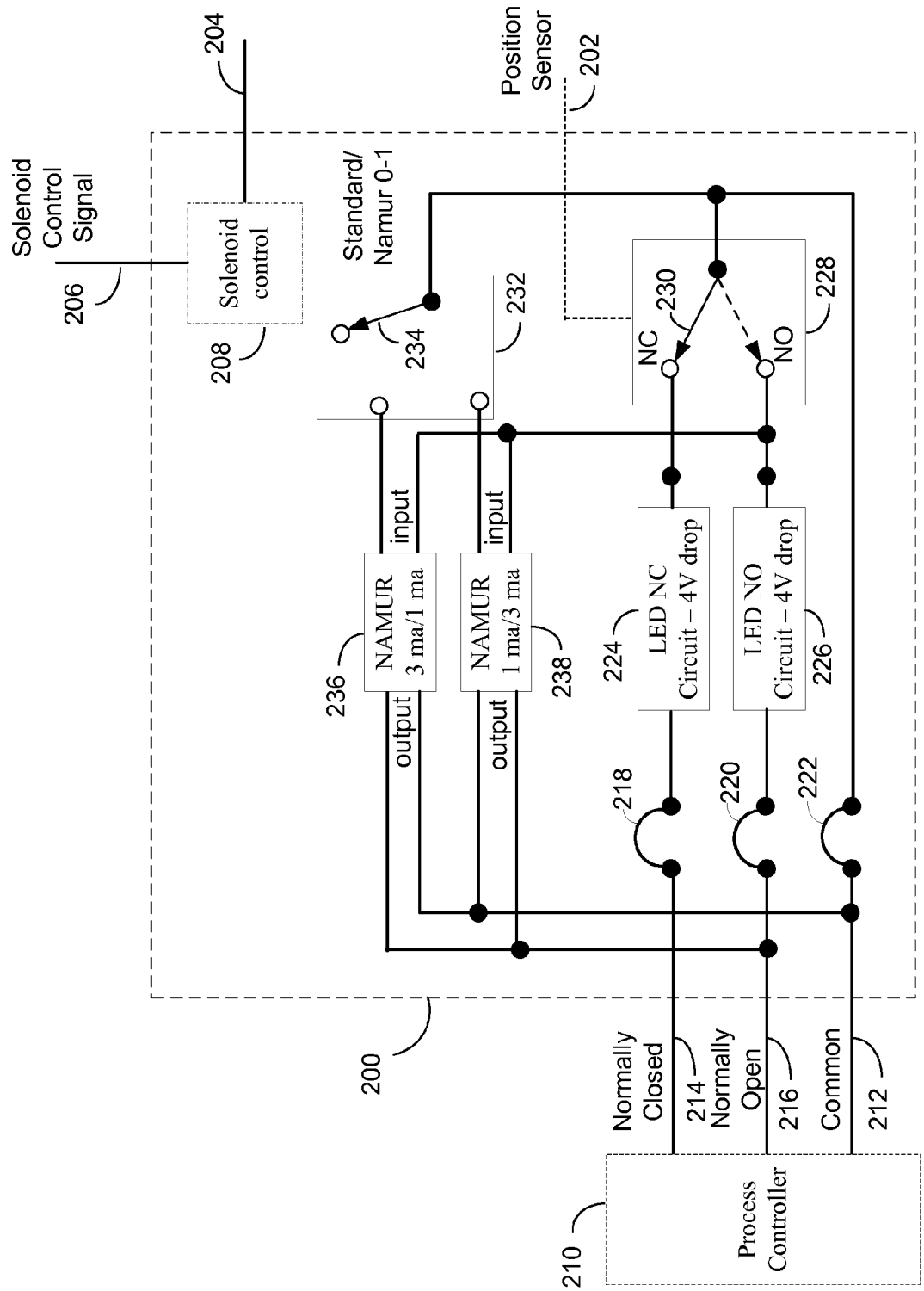
FIG. 4 is a simplified and representative switch module in a first operational configuration.

FIG. 4 is a simplified and representative switch module 200 in a first operational configuration. The switch module 200 may be used in the representative application illustrated in FIG. 1, in place of switch 115. For clarity, the valve or other process control element of FIG. 1 is not shown in FIGS. 4-7. As above, the switch module 200 is operationally coupled to a position sensor 202. For the purpose of backward compatibility, the switch module 200 may include a solenoid control 208 with a control signal input 206 and an electrical or pneumatic output 204. The switch module 200 may be coupled to a process controller 210, as in prior art installations, via a common connection 212, a normally closed connection 214 and a normally open connection 216.

Jumpers 218, 220 and 222 may couple their respective external connections to the common, normally closed and normally open connections of a position (dry) switch 228, with an actuator 230 or armature that moves between the normally closed and normally open positions. Also for backwards compatibility, indicator circuits 224 and 226 may be included. A selector 232 may have an actuator 234 operable between positions for a null connection (shown in FIG. 4) and other positions discussed with respect to FIGS. 6 and 7 below. A first NAMUR circuit 236 and a second NAMUR circuit 238 may be included in the switch module 200, but with the actuator 234 in the standard operating position as shown, the NAMUR circuits are disabled, for example, by removing their power connections (not illustrated).

In operation, with the jumpers 218, 220, and 222 installed, the switch module 200 may operate in a standard configuration with the dry switch 228 moving between the NO and NC positions responsive to the position sensor 202, alternately connecting the common connection 212 to the normally closed connection 214 or normally open connection 216. When the normally closed circuit is active, the indicator 224 will also be active. When the normally open circuit is active the indicator 226 will also be active.

Figure 5:
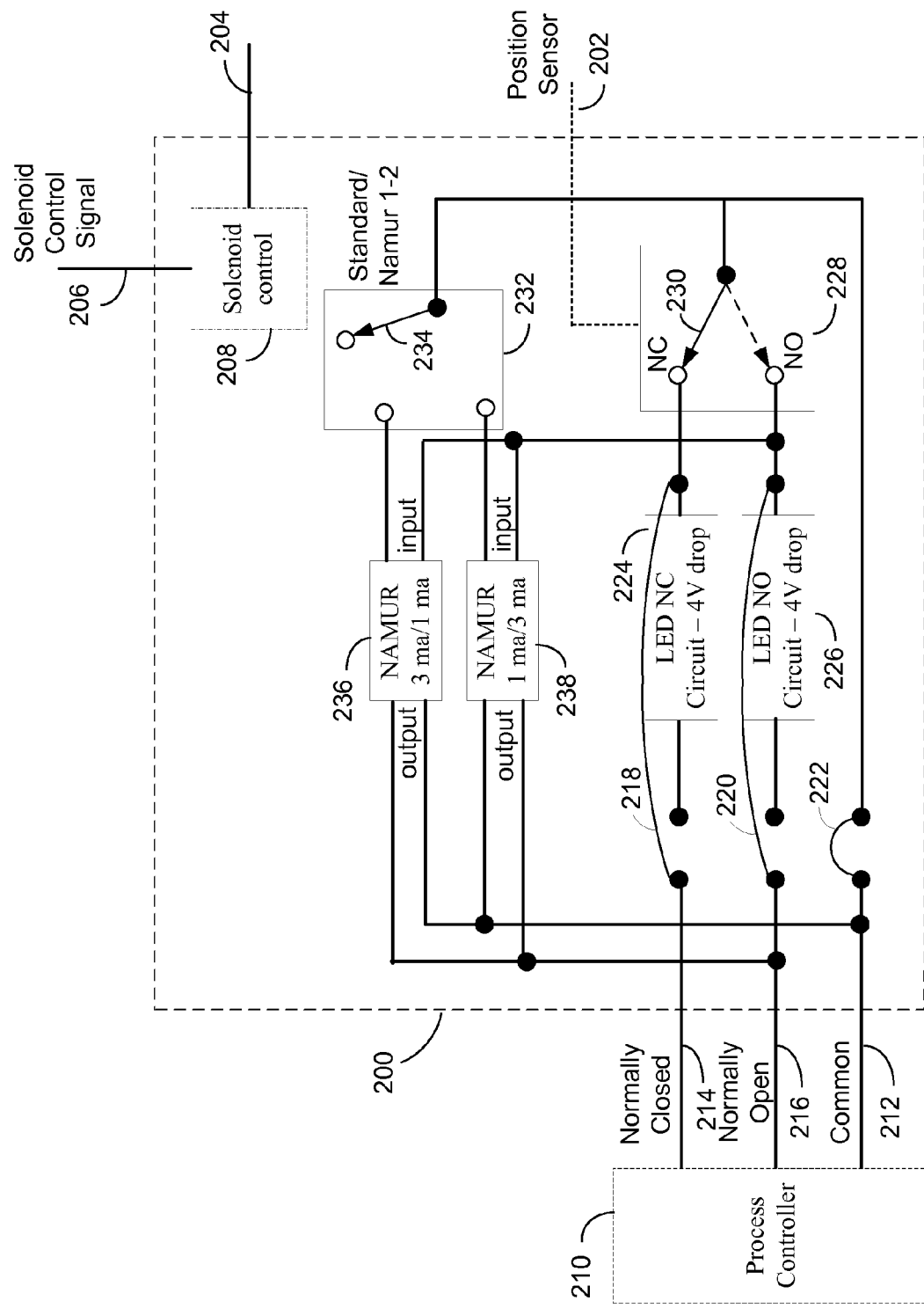
FIG. 5 is a simplified and representative switch module in a second operational configuration.

FIG. 5 is a simplified and representative switch module 200 in a second operational configuration. The elements of FIG. 5 are as found in FIG. 4, other than the jumpers 218 and 220 are reconfigured to bypass the indicator circuits 224 and 226. In this configuration, the switch module 200 will operate as described above with respect to FIG. 4 other than the LED indicators associated with activity on the NO and NC circuits will not light and the associated voltage drops over the indicator circuits 224 and 226 will not be incurred. As illustrated in FIG. 5, the jumpers 218 and 220 appear elongated, however, in practice the jumpers could be simple in-line blocks, as are known.

Figure 6:
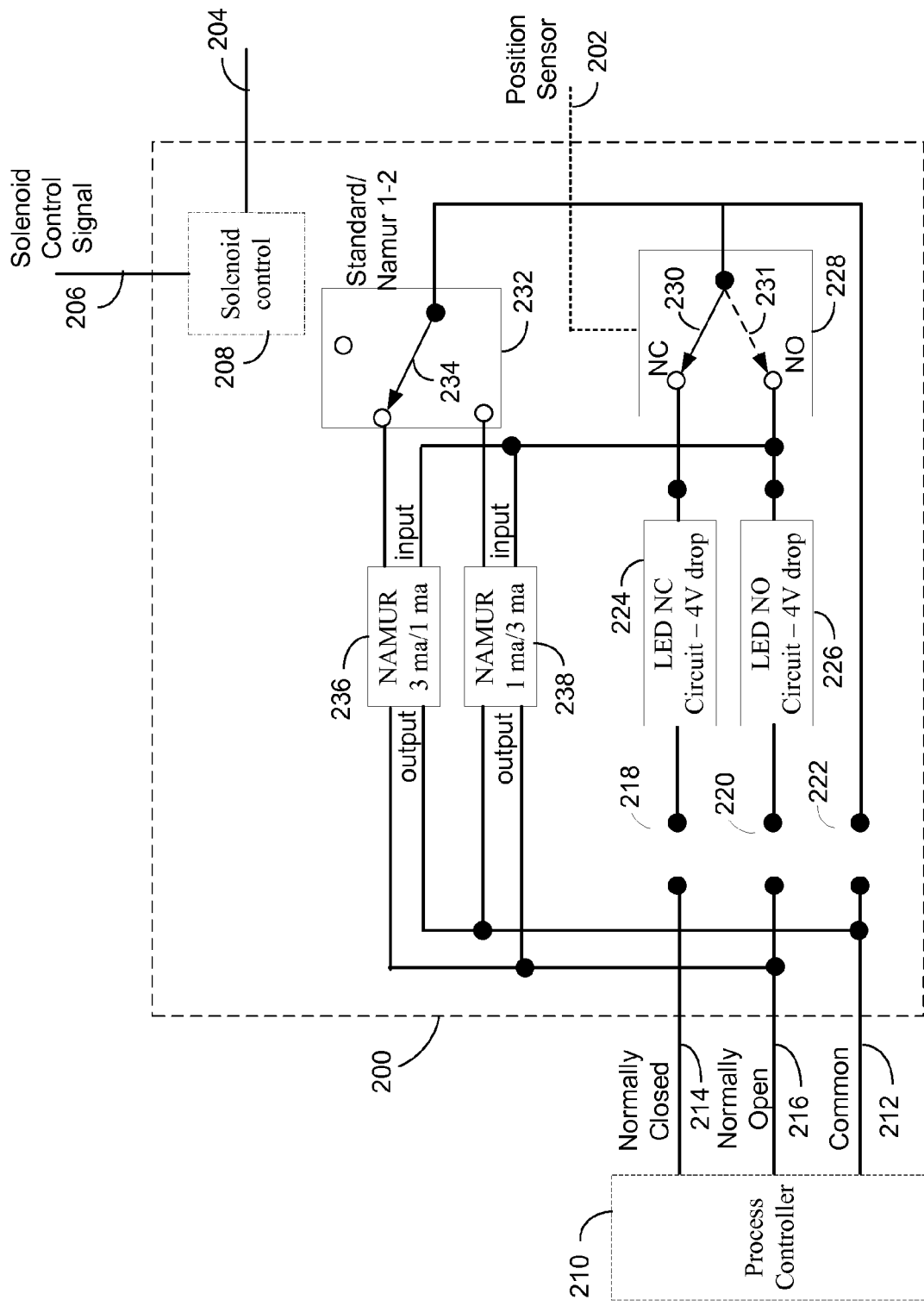
FIG. 6 is a simplified and representative switch module in a third operational configuration.

FIG. 6 is a simplified and representative switch module 200 in a third operational configuration. The switch module 200 of FIG. 6 is the same as described above in FIG. 4 except that the jumpers 218, 220 and 222 have been removed and selector 232 is positioned for actuator 234 to be in the middle position. With the selector in this position, NAMUR circuit 236 may be activated, for example, by connecting its power (not illustrated).

As shown in FIG. 6, with the position switch 228 in the normally closed position, the inputs to the NAMUR circuit 236 are not connected and the NAMUR circuit 236 may be configured to output a default 3 ma current through a circuit made through the common connection 212, the process controller 210 and the normally open connection 216. In an alternate embodiment, a 4/20 ma circuit, known in the industry, may be used in place of either or both NAMUR circuits 236 and 238.

When the position switch 228 is activated by a change in position sensor 202 or other external input, the actuator or armature 230 moves to a position indicated by dashed line 231, a circuit between the NAMUR circuit 236 inputs is completed and the NAMUR circuit output drops to the 1 ma value. In an alternate embodiment, the polarity of the NAMUR circuits may be reversed by connecting the NC connection of relay 228 to the inputs of NAMUR circuits 236 and 238.

Figure 7:
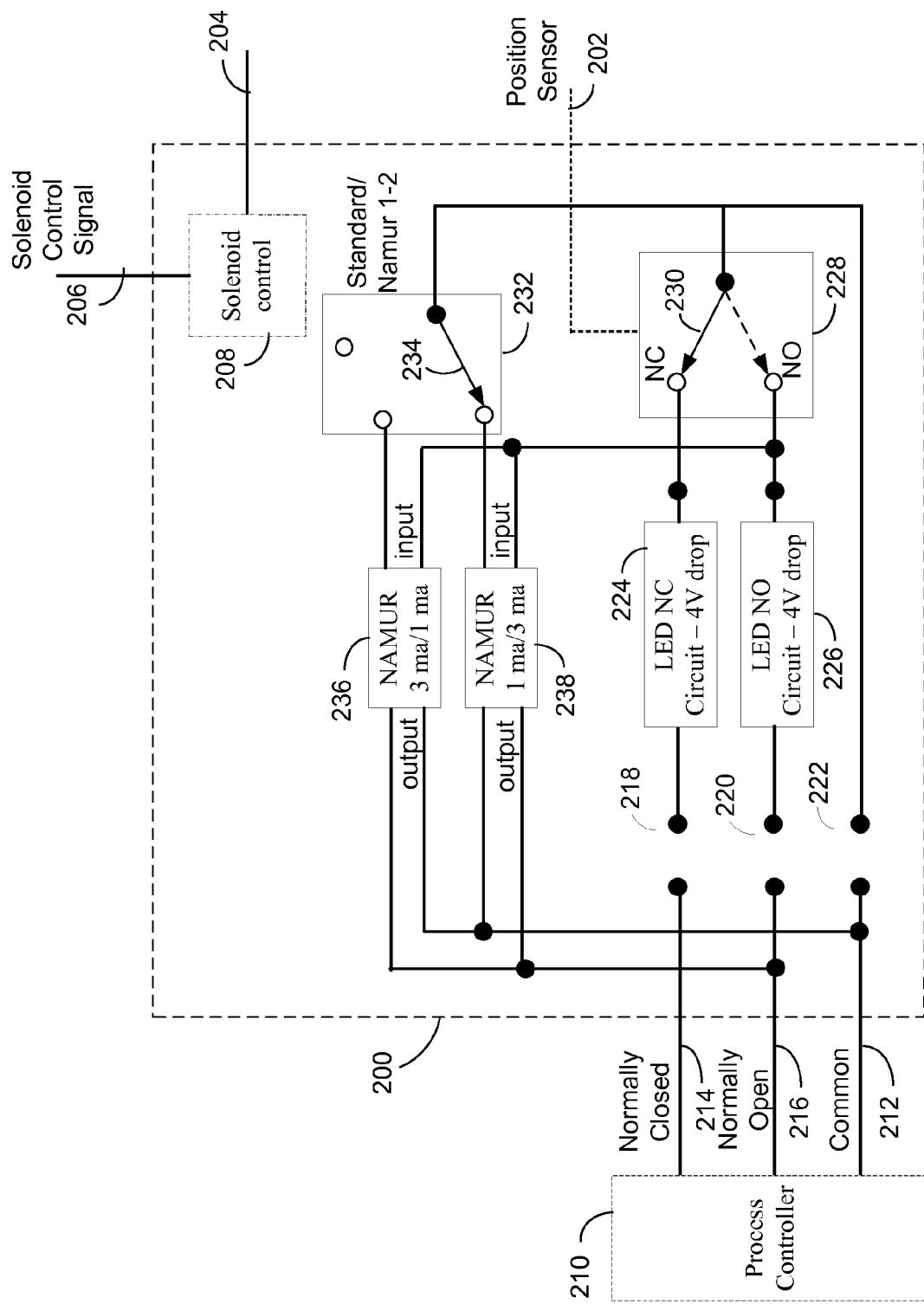
FIG. 7 is a simplified and representative switch module in a fourth operational configuration.

FIG. 7 is a simplified and representative switch module 200 in a fourth operational configuration. The switch module 200 of FIG. 7 is the same as described above in FIG. 4 except that the jumpers 218, 220 and 222 have been removed and selector 232 is positioned for actuator 234 to be in the bottom position. With the selector in this position, NAMUR circuit 238 may be activated, for example, by connecting its power (not illustrated).

As shown in FIG. 7, with the position switch 228 in the normally closed position, the inputs to the NAMUR circuit 238 are not connected and the NAMUR circuit 238 may be configured, opposite to NAMUR circuit 236, to output a default 1 ma current through a circuit made through the common connection 212, the process controller 210 and the normally open connection 216.

When the position switch 228 is activated, a circuit between the NAMUR circuit 238 inputs is completed and the NAMUR circuit output increases to a 3 ma value.

As can be seen, the inclusion of a second NAMUR circuit 238 configured with the opposite current polarity as the first NAMUR circuit 236 allows either current level to be configured in the normally open or normally closed states, providing more robust backwards compatibility to prior installation configurations.

Any of the embodiments of FIGS. 4-7 may be stacked to provide additional switch configurations for backup or for additional reporting. For example, two switch modules could be coupled to the same valve 102. The first could be configured for a relay output and the second configured for a NAMUR output for a separate monitoring loop (not depicted).

The embodiments of FIGS. 4-7 are illustrated using jumpers, a multi-position switch and a relay. Other configurations using motor controlled switches, solid state relays, semiconductor switches or various combinations of these, may be used and when combined with a suitable controller (not depicted) would allow remote programming of the switch module 200.

Figure 8:
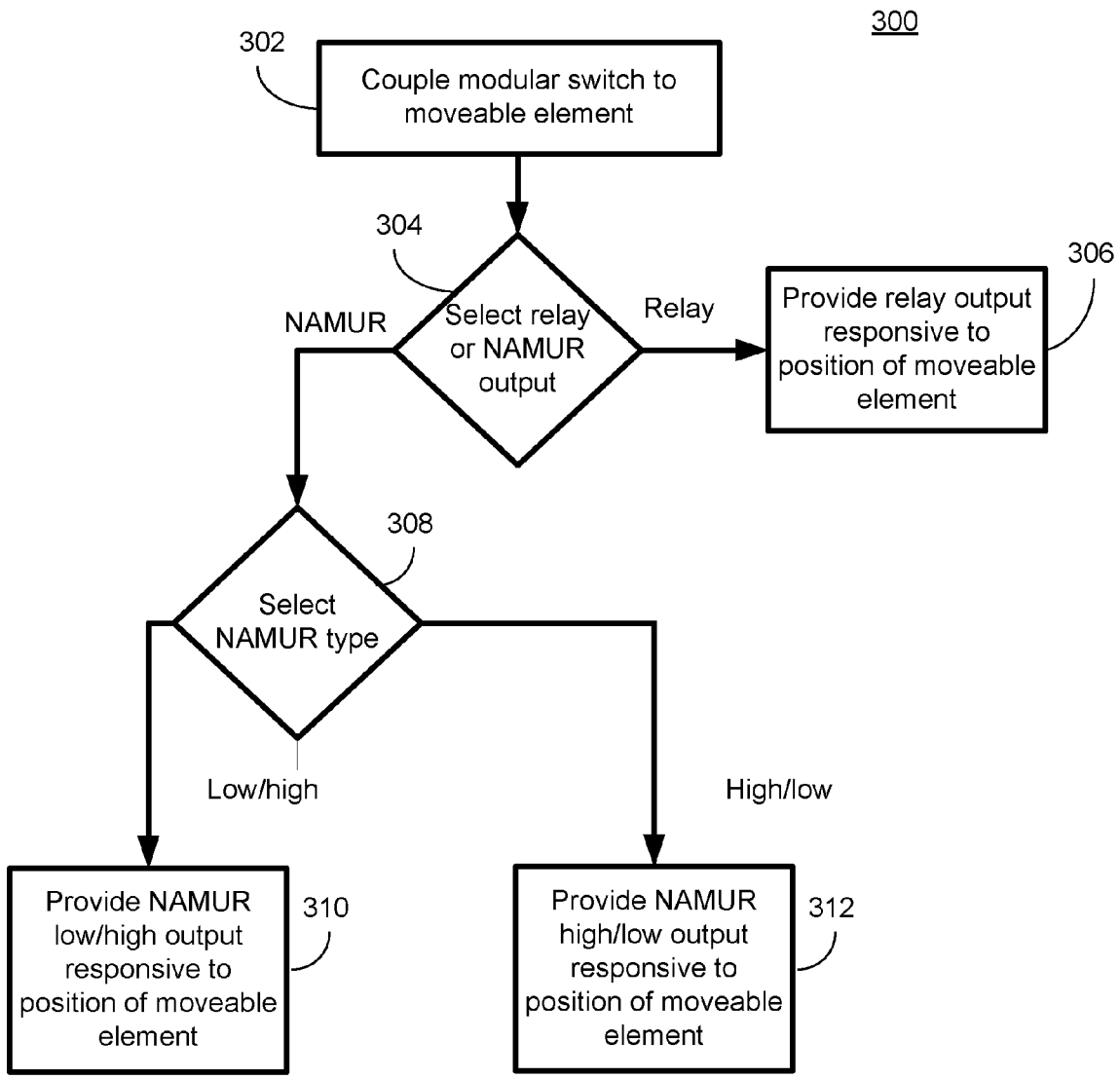
FIG. 8 is an illustration of a method of configuring and operating a switch module.

FIG. 8 is an illustration of a method 300 of configuring and operating a switch module 200. A block 302 may operationally couple a switch module 200 to a valve 102 using a position sensor 202. The position sensor may be a mechanical arm, a magnet, a ferrous material, etc., that moves when the valve 102 changes position. The movement of the position sensor 202 causes a corresponding electrical switch or relay to change position.

A block 304 may accept selection of a relay output or a NAMUR output. If 'relay' is selected, the jumpers 212, 214, 216 and selector switch 232 may be set to provide a relay output as discussed above with respect to FIG. 4 or FIG. 5.

If 'NAMUR' is selected, a block 308 may accept selection of a type of NAMUR output desired. If low current to high current is selected, for example, by a first position of switch 232, a block 310 may provide a desired low-to-high current output responsive to the position of the moveable element, such as a valve 102. Alternatively, if high current to low current is selected, for example, by a second position of switch 232, a block 312 may provide the desired high to low current output responsive to the position of the moveable element, such as a valve 102.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A switch module arranged and adapted to report a position of a moveable element external to the switch module, the switch module comprising:
   a first external connection, a second external connection, and a third external connection;
   a dry contact relay having a relay contact position responsive to a position of a component external to the switch module, the dry contact relay having a common connection, a normally open connection and a normally closed connection, where the normally open connection corresponds to a first position of the moveable element and the normally closed connection corresponding to a second position of the moveable;
   a NAMUR circuit having a first input connection pair and a first output connection pair;
   an electrical connection from the normally open connection of the dry relay to a first input of the first input connection pair of the NAMUR circuit;
   a selector operable to connect the common connection of the dry contact relay to i) a null contact of the selector or ii) a second input of the first input connection pair of the NAMUR circuit;
   a second electrical connection from the first output of the NAMUR circuit to one of the first external connection or the second external connection; and
   a third electrical connection between the second output of the NAMUR circuit to the third external connection;
   a first jumper that removeably couples the first external connection to the normally open connection of the relay;
   a second jumper that removeably couples second external connection to the normally closed connection of the relay; and
   a third jumper that removeably couples the third external connection to the common connection of the relay, wherein the position of the moveable element is observable via two or more of the external connections.

2. The switch module of claim 1, further comprising:
   a first indicator circuit coupled between the first jumper and the normally open connection of the relay; and
   a second indicator circuit coupled between the second jumper and the normally closed connection of the relay.

3. The switch module of claim 2, further comprising:
   a fourth jumper that removeably provides a short circuit across the first indicator circuit, removing the first indicator circuit from service in the switch module; and
   a fifth jumper that removeably provides a short circuit across the second indicator circuit, removing the second indicator circuit from service in the switch module.

4. The switch module of claim 1, further comprising a second NAMUR circuit having a current polarity opposite the second NAMUR circuit, having:
   a second input connection pair and a second output connection pair;
   an electrical connection from one of i) the normally open connection of the relay or ii) the normally closed connection of the dry relay to one connection of the second input connection pair of the second NAMUR circuit;
   a selector operable to connect the common connection of the dry contact relay to i) a null contact of the selector or ii) an other input connection of the second input connection pair of the second NAMUR circuit; and
a second electrical connection from the first output of the NAMUR circuit to one of the first external connection or the second external connection.

5. The switch module of claim 4, configured to provide a first polarity current output wherein:
the NAMUR circuit is enabled and the second NAMUR circuit is disabled;
the selector is connected between the normally open connection of the dry relay and a second input of the first input connection pair of the NAMUR circuit; and
each of the first jumper, the second jumper, and the third jumper are removed.

6. The switch module of claim 5, configured to provide a second polarity current output wherein:
the NAMUR circuit is disabled and the second NAMUR circuit is enabled;
the selector is connected between the normally open connection of the dry relay and the second input of the second input connection pair of the second NAMUR circuit; and
each of the first jumper, the second jumper, and the third jumper are removed.

7. The switch module of claim 1, configured to provide a relay output wherein:
the selector connects the common connection of the dry contact relay to the null contact of the selector; and
each of the first jumper, the second jumper, and the third jumper are installed and couple their respective connections.

8. The switch module of claim 1, arranged for physical coupling to another switch module to report the position of the moveable element in a combination of dry relay and NAMUR outputs.

9. The switch module of claim 1, further comprising a solenoid control having an electrical input and one of a mechanical output or a pneumatic output.

10. A method using a switch module to report a position of a moveable element of a component external to the switch module comprising:
coupling the switch module to the moveable element, the switch module having a position sensor responsive to a change in position of the moveable element;
selecting, at a selector of the switch module, a relay output or a NAMUR output, wherein selecting the NAMUR output includes connecting output lines of a NAMUR circuit to respective input connections of a process controller external to the switch module and connecting a common connection of a relay to a first input of the NAMUR circuit and connecting an other connection of the relay to a second input of the NAMUR circuit, wherein the relay causes a short circuit or an open circuit across the NAMUR inputs responsive to a position of the position sensor;
providing a first NAMUR circuit having a high/low current polarity and a second NAMUR circuit having a low/high current polarity;
when a NAMUR output is selected, selecting, at the switch module, a low/high current NAMUR output or a high/low current NAMUR output, wherein selecting the low/high current NAMUR output or the high/low current NAMUR output includes connecting one of the first NAMUR circuit or the second NAMUR circuit to the common connection of the relay and the other connection of the relay; and providing the selected output responsive to the position sensor.

11. The method of claim 10, wherein selecting the relay output comprises:
connecting respective connections of a dry contact relay that operates responsive to the position sensor to a common output, a normally closed output, and a normally open output of the switch module, each of the common output, the normally closed output, and the normally open output for connecting to respective inputs of a process controller external to the switch module.

12. The method of claim 11, further comprising:
activating a first indicator circuit when the position sensor is in a first position and the relay output is selected; and
activating a second indicator circuit when the position sensor is in a second position and the relay output is selected.

13. A switch module that reports a position of an external component, the switch module comprising:
a position sensor
a relay coupled to the position sensor having an armature contact responsive to the position sensor, a normally closed contact and a normally open contact;
a first NAMUR circuit with a first input and a second input configured to output a high current when an open circuit appears across the first and second inputs and to output a low current when a short circuit appears across the first and second inputs, and a first output signal pair configured to connect to a process controller;
a second NAMUR circuit with a first input and a second input configured to output a low current when a open circuit appears across the first and second inputs and to output a high current when a short circuit appears across the first and second inputs, and a second output signal pair configured to connect the process controller;
a selector switch that connects the armature contact of the relay to one of a null contact, the first NAMUR circuit first input, or the second NAMUR circuit first input; and
removable jumpers that connect the armature contact, the normally closed contact and the normally open contact to respective connections of the process controller, wherein the jumpers are in place when the selector switch is at the null contact and the jumpers are removed when the selector switch couples the armature contact to either the first NAMUR circuit or the second NAMUR circuit.

14. The switch module of claim 13, further comprising a solenoid control having an electrical input and a pneumatic output.

15. The switch module of claim 13, further comprising a solenoid control having an electrical input and a mechanical output.

16. The switch module of claim 13, further comprising a first indicator light active when the selector switch is in the null position, the jumpers are in place and, responsive to the position sensor, the armature contact is in contact with the normally open contact.

17. The switch module of claim 13, further comprising a second indicator light active when the selector switch is in the null position, the jumpers are in place and, responsive to the position sensor, the armature contact is in contact with the normally closed contact.

* * * * *